United States Patent [19]

Fujino et al.

[11] Patent Number: 4,681,417

[45] Date of Patent: Jul. 21, 1987

[54] CAMERA WITH MOTOR-DRIVEN DIAPHRAGM DEVICE

[75] Inventors: Masahisa Fujino, Tokyo; Hidehiko Fukahori, Kanagawa; Toshihiko Satoh, Tokyo, all of Japan

[73] Assignee: Canon Kabushiki Kaisha, Japan

[21] Appl. No.: 910,277

[22] Filed: Sep. 16, 1986

Related U.S. Application Data

[63] Continuation of Ser. No. 777,008, Sep. 17, 1985, abandoned, which is a continuation of Ser. No. 617,798, Jun. 6, 1984, abandoned.

[30] Foreign Application Priority Data

Jun. 13, 1983 [JP] Japan ................. 58-105220

[51] Int. Cl.⁴ ............ G03B 7/00; G03B 9/08
[52] U.S. Cl. ................. 354/234.1; 354/266; 354/271.1
[58] Field of Search ............... 354/441–446, 354/451–453, 448, 271.1, 228, 234.1, 235.1, 412, 268, 266, 267.1; 352/141, 142, 915

[56] References Cited

U.S. PATENT DOCUMENTS

| | | | |
|---|---|---|---|
| 3,518,930 | 7/1970 | Thieme et al. | 354/453 |
| 3,772,974 | 11/1973 | Shimomura | 354/451 |
| 3,842,587 | 10/1974 | Strauss et al. | 354/412 |
| 3,914,034 | 10/1975 | Komine | 352/142 |
| 4,192,588 | 3/1980 | Wagensonner et al. | 354/452 |
| 4,281,909 | 8/1981 | Ishibashi | 352/91 S X |
| 4,322,144 | 3/1982 | Suzuki et al. | 354/453 |
| 4,443,083 | 4/1984 | Nakano | 354/271.1 X |

*Primary Examiner*—W. B. Perkey
*Attorney, Agent, or Firm*—Toren, McGeady & Associates

[57] ABSTRACT

A camera having a motor-driven diaphragm device comprises a diaphragm driving motor disposed within the camera; a diaphragm driving member which is driven by the motor to open or close the diaphragm aperture of a photo-taking lens; and a change-over switch to shift the rotating direction of the motor depending on the opening or closing of a switch which operates in association with a shutter release button. The diaphragm aperture is stopped down by the driving force of the motor when the release button is depressed and is opened to the fully open position thereof by reverse rotation of the motor when the release button is no longer depressed.

6 Claims, 6 Drawing Figures

CAMERA WITH MOTOR-DRIVEN DIAPHRAGM DEVICE

This is a continuation of application Ser. No. 777,008, filed Sept. 17, 1985, now abandoned which was a continuation of application Ser. No. 617,798, filed June 6, 1984, now abandoned.

BACKGROUND OF THE INVENTION

1. Field of the Invention

This invention relates to a motor-driven diaphragm device for a camera.

2. Description of the Prior Art

Heretofore, a single-lens reflex camera using an interchangeable lens, which is provided with an automatic stop or diaphragm device of the present type, has a diaphragm driving spring charged in response to a film winding operation and stops the diaphragm aperture down to a preset value from a full or maximum open position thereof with the stored force of the driving spring. The force, which is thus charging the diaphragm driving spring, imposes a large load on the camera together with a film driving force for winding the film and a mirror driving force. This impairs the smoothness of operation in manually winding the film and necessitates use of a large motor with a large output for simultaneously charging all the loads while film winding with a motor incorporated in the camera. Furthermore, in the event of continuous photography, it is conventional to repeat the processes of stopping down the aperture and bringing the aperture back to the full open position thereof for every photography frame. However, the driving spring charging force requires large photography time intervals for these processes. In the case of an interchargeable lens of the type permitting manual stopping, therefore, it shortens the operation time for quicker photography by shifting the automatic stopping-down operation to a manual stopping-down operation. However, since focusing on the lens is not easy when the aperture is stopped-down, the aperture must be fully opened upon completion of every continuous photography operation. This requirement greatly impairs the operability of the camera. If a lens is mounted on the camera in a stopped-down condition, it tends to cause problems, such as misplacement of an automatic stop lever, etc.

It is an object of this invention to provide a camera in which a motor is provided within the camera body especially for operating an automatic stop arrangement dispersing the winding load for smooth winding in the event of manual film winding and permitting use of a smaller output winding motor. The stopping-down motor can be easily disposed in an unused space within the camera allowing a considerable degree of latitude in its arrangement within the camera. Therefore, since the stopping-down motor permits the use of a winding motor of a reduced size, the camera as a whole can be smaller.

It is another object of the invention to provide a camera in which a stopping-down motor is actuated and stops down the diaphragm aperture of a lens by means of a switch which operates in response to the operation of a shutter release button; the lens is kept in the stopped-down condition as long as the release button is kept depressed; therefore, in the event of continuous photography, continuous photography can be carried out at an increased speed without recourse to a troublesome manual stopping-down operation required by prior art cameras.

It is a further object of the invention to provide a camera wherein a switch detects completion of a stopping-down process; and this switch is connected in series with a shutter release switch and permits a shutter release only when the aperture of the lens is correctly stopped down to a predetermined value, so that the operability of the camera can be enhanced.

These and further objects and details of the invention will become apparent from the detailed description of a preferred embodiment thereof taken in connection with the accompanying drawings.

SUMMARY OF THE INVENTION

A camera having a motor driven diaphragm device comprising a diaphragm driving motor and diaphragm driving member which is driven by the motor to actuate a diaphragm member of an interchangeable lens and a start switch which, in response to the operation of a release button, closes and opens to start and stop the diaphragm driving motor. The apparatus also includes a change-over switch means which, in response to the operation of the start switch, shifts the rotating direction of the diaphragm driving motor, whereby, when the release button is depressed, the start switch closes to start the motor driving the diaphragm driving member in an aperture stopping-down direction. When the release button is released from a depressed state thereof, the change-over switch means shifts the rotating direction of the motor to move the diaphragm driving member in an aperture opening direction.

DETAILED DESCRIPTION OF THE PREFERRED EMBODIMENTS

Figure 1:
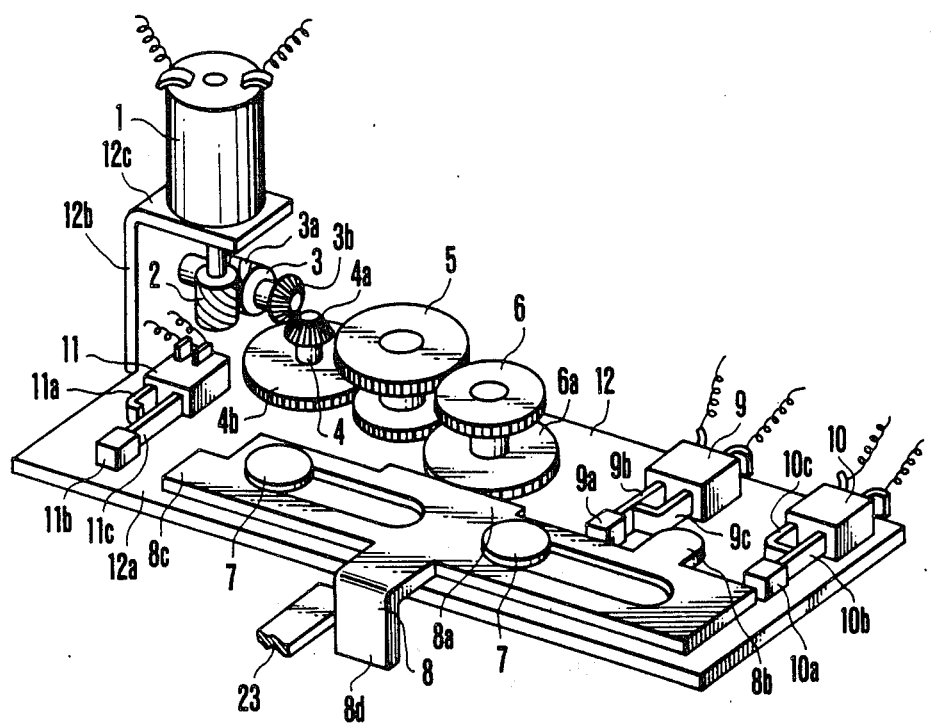
FIG. 1 is an oblique view showing a motor-driven stopping-down device in an embodiment of the present invention.

Referring to FIG. 1 which shows an embodiment of the invention, the illustration includes a diaphragm driving motor 1 which is secured to the surface of a rack plate 12c formed as a unit with a base plate 12 for a diaphragm driving mechanism, the plate 12 is secured to an inner part of a camera body (not shown); a worm 2 is secured to the output shaft of the motor 1; a worm wheel 3a engages the worm 2; a bevel gear 3b is secured to a shaft 3 formed as a unit with the worm wheel 3a, the bevel gear 3b is rotatably carried by a bent-up part 12b of the base plate 12; another bevel gear 4a engages the bevel gear 3b and is secured to a shaft 4 of a spur gear 4b; and double spur gears 5 and 6. These gears 3b, 4a, 4b, 5 and 6 are all rotatably carried by the base plate 12. An automatic diaphragm driving plate 8 is provided with a rack part 8a which engages a spur gear 6a and is mounted for sliding movement over the base plate 12 in the longitudinal direction while being guided by pins 7. The automatic diaphragm driving plate 8 has an arm 8d which engages an automatic stopping lever 23 of an interchangeable lens. A stopping-down switch 9 is opened and closed under the control of another arm 8b of the automatic diaphragm driving plate 8. Under all conditions with the exception of having completed a stopping-down process, the stopping-down switch 9 closes, supplying power to the motor 1. Upon completion of the stopping-down process, the arm 8b pushes an insulation member 9a. Then, a movable contact piece 9b comes away froma fixed contact piece 9c to open the stopping down switch 9 and thus to cut off the power to the motor 1. An aperture opening switch 10 likewise opens and closes under the control of the arm 8b of the driving plate 8. The aperture opening switch 10 closes supplying power to the motor 1 when the aperture is not fully open. With the aperture fully open, when the arm 8b pushes an insulation member 10a, movable contact piece 10b moves away from a fixed contact piece 10c, cutting off power to the motor 1. A stopping-down completion detecting switch 11 is normally open and closes when the fore end 8c of the driving plate 8 pushes an insulating member 11b only after completion of a stopping-down process.

Figure 2:
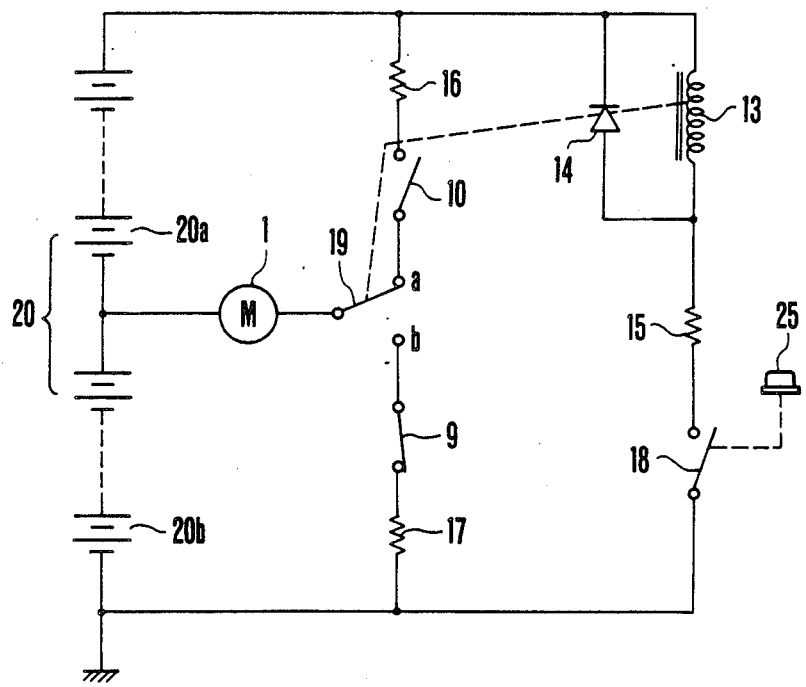
FIGS. 2 and 3 are circuit diagrams showing the circuit arrangement of the embodiment in FIG. 1.
Figure 3:
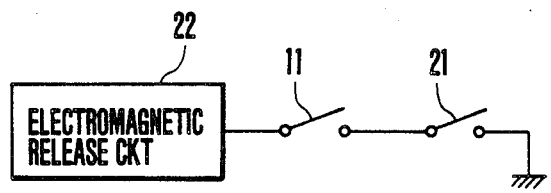
Figure 4:
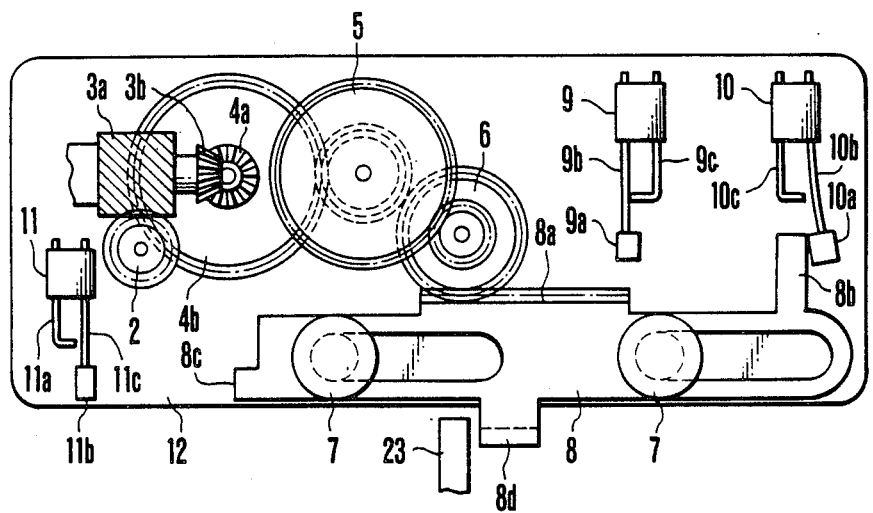
FIGS. 4, 5 and 6 are plan views showing the embodiment in various states thereof.

In FIG. 2, reference numeral 20 identifies a battery for driving the motor 1. One electrode of the motor 1 is connected to a neutral point tap of the battery 20. A motor start switch 18 closes in response to depressing a release button 25. A relay 13 is connected in series with the battery 20 and the motor start switch 18. A change-over switch 18 is connected to the other electrode of the motor 1 and has its connecting position shifted between its terminals "a" and "b" by the relay 13. A diode 14 is provided for preventing a counter electromotive force. Resistors 15, 16 and 17 are provided for current limiting. Referring now to FIG. 3, a release switch 21 closes in response to depressing the release button 25 and is connected to an electromagnetic shutter release circuit 22 via the above stopping-down completion detecting switch 11. The embodiment operates as follows:

When photography preparation is completed with the shutter having been charged, the diaphragm driving mechanism has the diaphgram driving plate 8 located in a position shifted to the right-hand side, as shown in FIG. 4. The automatic stopping lever 23 of an interchangeable lens is urged by a spring (not shown) to move toward a maximum aperture position. The aperture is thus kept in a maximum or fully open position with the lever 23 abutting a limiting member (not shown). At that moment, the start switch 18, release switch 21, the aperture opening switch 10 and the stopping-down completion detecting switch 11 are off; the stopping-down switch 9 is on; and the change-over switch 19 is connected to the terminal "a", as shown in FIGS. 2 and 3.

Figure 5:
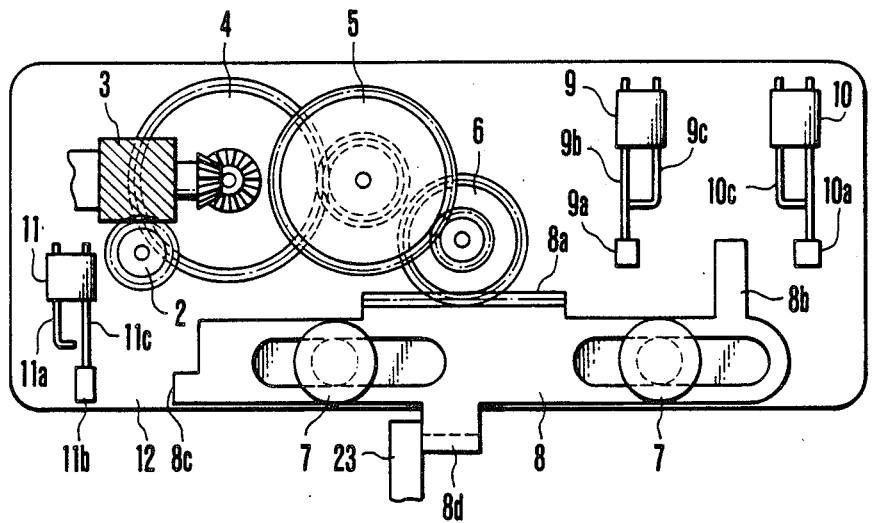
Figure 6:
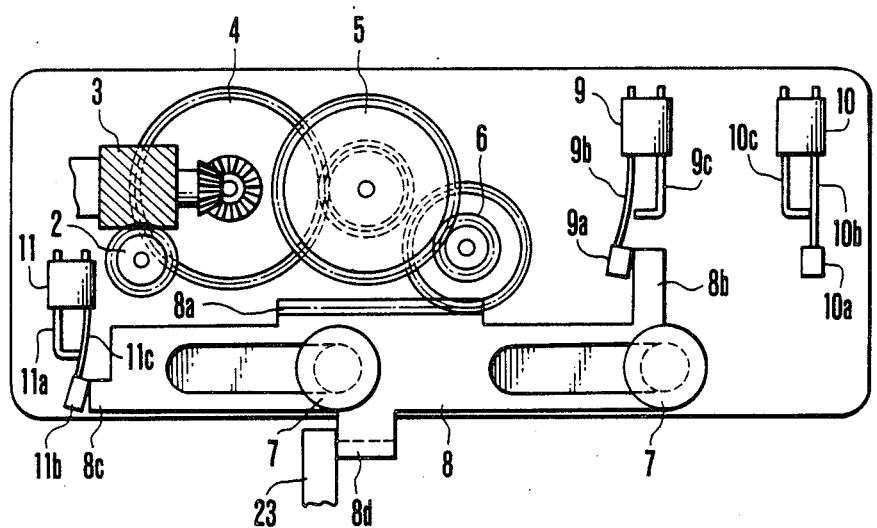

When the release button 25 of the camera is pushed under this condition, the start switch 18 is first closed. Then, the release switch 21 closes. However, since the stopping-down completion detecting switch 11 remains open, the electromagnetic shutter release circuit 22 does not operate to release the shutter. With the start switch 18 having turned on, the relay 13 is energized, shifting the connection position of the change-over switch 19 from the terminal "a" to the other terminal "b". A voltage on a side 20b of the power source 20 is impressed on the motor 1. This rotates the diaphragm driving motor 1. The diaphragm driving plate 8 is then moved to the left, as viewed on the drawing, via the reduction gear trains 2, 3, 4, 5 and 6. The movement of the driving plate 8 causes its arm 8d to engage the automatic stopping lever 23. The automatic stopping lever 23 is pushed to the left by the arm 8d and begins a stopping-down action. At this moment, as shown in FIG. 5, another arm 8b of the plate 8 moves away from the insulating part 10a of the aperture opening switch 10, closing the latter. Meanwhile, since the change-over switch 18 is connected to the terminal "b" and the stopping-down switch 9 is closed, the motor 1 continues to rotate. With the automatic stopping lever 23 moving a predetermined extent in association with the movement of the driving plate 8, the diaphragm mechanism of the lens operates accordingly. The aperture is stopped down to a preset value. When the driving plate 8 reaches a position as shown in FIG. 6, the lens has been completely stopped down. At this instant, the arm 8b of the driving plate 8 pushes the insulating member 9a of the stopping-down switch 9 to open the stopping-down switch 9. Power to the motor 1 is therefore cut off. The urging force of the above spring is exerted on the diaphragm driving plate 8 via the automatic stopping lever 23 in an aperture opening direction. However, since the worm 2 and the worm wheel 3a engage each other to prevent reverse rotation, the aperture of the lens is kept completely stopped down even after the motor 1 stops.

Meanwhile, since the fore end 8c of the diaphragm driving plate 8 pushes the movable contact piece 11c through the insulating member 11b bringing it into contact with the fixed contact piece 11a, the stopping-down completion detection switch 11 closes. This renders the release circuit 22 operative thereby releasing the shutter.

When the release button 15 is no longer depressed, the motor start switch 18 opens following the release switch 21. Then, power to the relay 13 is cut off. This causes the change-over switch 19 to shift by itself to the side of the terminal "a". Then, the voltage on the side 20a of the power source 20 is impressed on the motor 1 via the aperture opening switch 10. The motor 1 begins to rotate in the reverse direction. The diaphragm driving plate 8 moves back to the right. When the plate 8 reaches the maximum aperture opening position shown in FIG. 4, the switch 10 opens, cutting off the power to the motor 1 and brings the operation of the diaphragm driving mechanism to a stop.

Furthermore, with the release button 25 depressed, when the release button 25 is kept depressed after the aperture is stopped down and shutter release is effected, the stopping-down completion condition is maintained while power is no longer supplied to the motor 1. Therefore, in the case of a camera which has a motor-driven winding device and is capable of performing continuous photography, once the aperture of the lens is stopped down with the release button 25 depressed, continuous photography can be carried out at the same aperture by just continuously depressing the release button 25 without operating the diaphragm driving mechanism.

In accordance with the invention, as described in the foregoing, the aperture of the lens is stopped down by means of a motor 1 incorporated in the camera solely for that purpose. This arrangement lightens the load imposed on a film winding operation. Therefore, in the case of a camera of the type having a winding motor included therein, the invention permits use of a motor of a small output as the winding motor. Besides, since the aperture stopping-down motor can be disposed within a camera without much restriction, it permits effective utilization of space left within the camera contributing to reduction of camera size. Another advantage of the embodiment of the invention is that the aperture stopping-down operation can be performed by a preliminary stroke depressing the shutter release button 25 and, therefore, the aperture can be brought to the maximum open position by simply releasing the release button 25 from being depressed. The aperture can also be kept stopped-down by keeping the release button 25 depressed. This feature of the invention enhances the operability of the camera and enables the photographer to carry out continuous photography at high speeds without necessitating troublesome manual stopping-down operation previously required. Also, in the embodiment of the invention, that means which detects the fully open state of the aperture is made to detect the driving position of a member for driving the aperture in the opening direction. Furthermore, this detecting means is arranged so that after the aperture has reached a preset fully open value by the drive member, it further slightly moves to a position where the fully open state of the aperture is detected. Therefore, even if there are errors in the dimensions of the parts, the detecting means can surely detect the fully open state of said aperture.

What we claim:

1. A camera having an electric driving device, comprising:
   a diaphragm driving motor and a power source device;
   diaphragm driving means driven by said motor for moving between an aperture opening position and an aperture stopping-down position for actuating a diaphragm member of an interchangeable lens;
   changeover switch means which changes over the direction of current supplied to the motor from said power source device and has a full open side terminal for rotating the motor to an aperture opening direction and a stop down side terminal for rotating the motor to an aperture stopping-down direction;
   actuating means for actuating said changeover switch;
   a start switch which closes by depressing a release button for actuating said actuating means;
   whereby said changeover switch means is normally at a position to rotate said motor to the aperture opening direction, and when said start switch is closed, said changeover switch means is changed over to a position to rotate the motor to the aperture stopping-down direction;
   an aperture opening switch connected between the full open side terminal of said changeover switch means and the power source device, said switch being opened when said diaphragm driving means is at the aperture opening position and being closed when said aperture driving means is at other positions than the same; and
   an aperture stopping-down switch connected between the stop down side terminal of the changeover switch means and the power source device, said switch being opened when the diaphragm driving means is at an aperture stopping-down completion position and being closed when it is at other positions than the same;
   whereby said power source device has a terminal for producing an intermediate voltage between a positive electrode and a negative electrode, and said terminal is connected to said motor while the other terminals (the positive electrode and the negative electrode) are connected to said aperture opening switch and aperture stopping-down switch.

2. A camera according to claim 1, further comprising:
   an electro-magnetic release circuit;
   a switch arranged to detect completion of an aperture stopping-down process in response to the operation of said diaphragm driving member; and
   a switch connected in series with said detecting switch and arranged to be responsive to the operation of said release button,
   said electro-magnetic release circuit being arranged to release a shutter when completion of an aperture stopping-down process is detected by said detecting switch.

3. A camera according to claim 1, wherein said changeover switch means and actuating means are made of relays.

4. A camera according to claim 1, wherein said diaphragm driving means has a reduction mechanism including a worm and a worm wheel.

5. A camera having a drive member arranged to move in response to rotation of an electric motor and diaphragm drive means responsive to one direction of rotation of said motor which moves said drive member in a first direction so that a diaphragm is driven by said movement in an aperture opening direction, and responsive to the direction opposite to said first direction of rotation of said motor which moves said drive member in said opposite direction so that said diaphragm is driven by said movement to move in the aperture closing direction, comprising:
   detecting means for detecting a maximum aperture opening state of said diaphragm, said detecting means not detecting the maximum aperture opening state of said diaphragm at a position where the size of the aperture opening of said diaphragm reaches a maximum value by the movement of said drive member in the first direction, said detecting means detecting the maximum aperture opening state of said diaphragm only when said drive member further slightly moves in the same direction from the position where the size of the aperture opening of said diaphragm reaches the maximum value; and
   motor control means for stopping said electric motor when the maximum opening state of said diaphragm is detected by the detecting means.

6. A camera as in claim 5 further comprising:
(a) means responsive to actuation of a release for rotating said motor in said first direction to drive said diaphragm to move in a stopping down direction; and
(b) means for sustaining said diaphragm in the stopped down state under the condition that the release actuation is in progress.

* * * * *